(12) United States Patent
Ricker et al.

(10) Patent No.: US 7,533,685 B2
(45) Date of Patent: May 19, 2009

(54) LUBRICANT COLLECTION APPARATUS

(75) Inventors: Robert Dallas Ricker, Middletown, DE (US); Viet X. Nguyen, Wilmington, DE (US); Bernard John Permar, Middletown, DE (US); Jerome M. Szczepaniak, West Chester, PA (US); Lindy T. Miller, West Chester, PA (US); Eric Alan Schneider, Philadelphia, PA (US); Bill Van Ocker, Perkasie, PA (US)

(73) Assignee: Agilent Technologies, Inc., Santa Clara, CA (US)

( * ) Notice: Subject to any disclaimer, the term of this patent is extended or adjusted under 35 U.S.C. 154(b) by 598 days.

(21) Appl. No.: 11/046,263

(22) Filed: Jan. 28, 2005

(65) Prior Publication Data
US 2006/0180396 A1   Aug. 17, 2006

(51) Int. Cl.
*F16N 31/00* (2006.01)
(52) U.S. Cl. .................. 137/312; 220/571; 184/106; 222/108
(58) Field of Classification Search .......... 137/312; 220/571; 184/106; 222/108
See application file for complete search history.

(56) References Cited

U.S. PATENT DOCUMENTS 4,120,621 A  10/1978  Pikul
4,903,723 A * 2/1990  Sublett ................. 137/312
4,940,398 A  7/1990  Berges et al.
6,691,884 B1 * 2/2004  Dwyer ................... 220/571

FOREIGN PATENT DOCUMENTS

| EP | 0409287 A | 1/1991 |
| JP | 02286894 A | 11/1990 |
| JP | 07217570 A | 8/1995 |
| WO | WO9214060 A | 8/1992 |

OTHER PUBLICATIONS

Silencer SSH11TF, SSH21TF and SSH41TF, Noise reduction box for vacuum pumps, Comfortable working by less noise in the laboratory, W. Schrader, C. Völkle—Alte Schulstraße 39, 88400 Biberach, Germany, Aug. 2003.
Installation and Users Manual, SSH11TF SSH21TF SSH41TF Noise reduction box for vacuum pumps, Sonation, Wolfgang Schrader & Vö lkle—Alte Schulstraße 39, 88400 Biberach, Germany, pp. 1-7, Jan. 2003.

* cited by examiner

*Primary Examiner*—Kevin L Lee
(74) *Attorney, Agent, or Firm*—Marc Bobys

(57) ABSTRACT

An apparatus for collecting lubricant, such as from a vacuum pump, is disclosed. In certain embodiments the apparatus includes a cabinet for retaining a vacuum pump and a variable depth basin beneath the cabinet for collecting lubricant from a vacuum pump. In specific implementations the variable depth basin is deepest proximate the front of the cabinet.

12 Claims, 16 Drawing Sheets

LUBRICANT COLLECTION APPARATUS

BACKGROUND

Vacuum pumps are widely used in laboratory environments to permit the operation of analytical equipment and to conduct experimental procedures. For example, mass spectroscopy equipment requires strong vacuums in order to operate properly. Although vacuum pumps are essential to many analytical and experimental tasks, the pumps are often relatively loud and cumbersome to maintain. Vacuum pumps can be isolated within small cabinets to reduce ambient noise, but such isolation can cause overheating. Vacuum pumps also require maintenance to adjust pump settings and to remove or exchange excess lubricant, tasks that are often difficult with existing cabinets because existing cabinets can make it difficult to access and perform routine maintenance on the vacuum pump.

Therefore, a need exists for improved cabinets for containing vacuum pumps.

SUMMARY

The present invention is directed to an apparatus for collecting lubricant, such as from a vacuum pump. Certain embodiments include a cabinet for retaining a vacuum pump, the cabinet comprising a top surface, a first side, and a second side at least partially defining an enclosure for the vacuum pump. The cabinet further contains a first support configured to retain the vacuum pump within the enclosure, and a second support configured to hold an oil-retention basin beneath the vacuum pump. The oil-retention basin has a variable depth, and is removable from the cabinet without removing the vacuum pump from the cabinet.

In specific embodiments the apparatus for collecting lubricant from a vacuum pump includes an enclosure configured to retain a vacuum pump, the enclosure defined by a top surface, a first wall, a second wall. The enclosure contains a first support configured to hold a vacuum pump in place during operation, plus a second support configured to hold a variable-depth lubricant-retention basin beneath the vacuum pump. This second support is configured to allow removal of the variable depth basin without removal of the vacuum pump from the enclosure.

The above summary of the present invention is not intended to describe each disclosed embodiment or every implementation of the present invention. The Figures and the detailed description that follow more particularly exemplify these embodiments.

DETAILED DESCRIPTION

Figure 1:
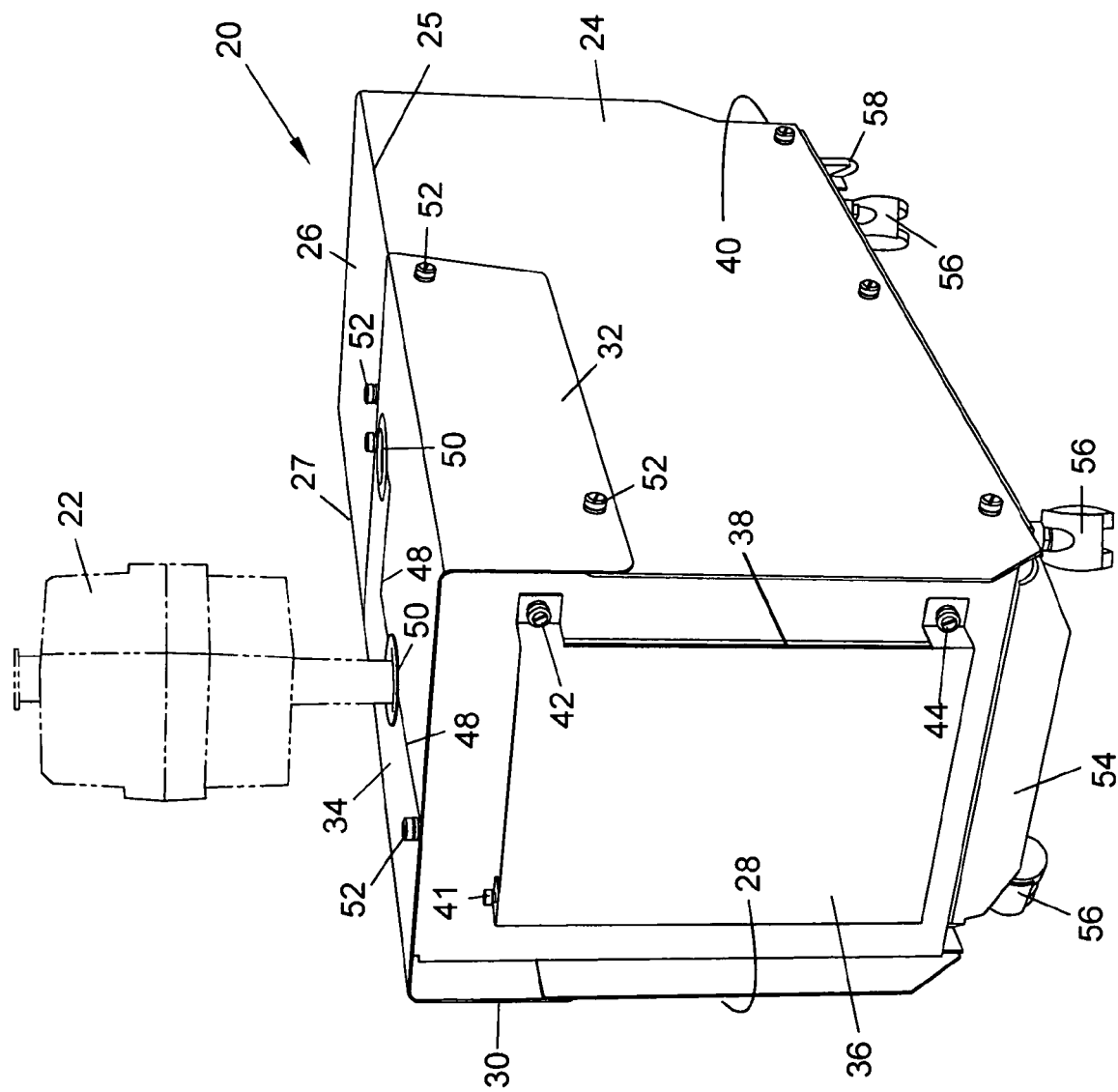
FIG. 1 is a front perspective view of a cabinet for retaining a vacuum pump.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to FIGS. 1-7, a cabinet 20 containing a vacuum pump 22 is shown in an example embodiment. The cabinet 20 is suitable for holding a vacuum pump 22 during operation of the pump 22, allowing the vacuum pump 22 to be kept cool while also allowing relatively easy access to the vacuum pump and reducing ambient noise generated by the vacuum pump. The vacuum pump 22 can be used, for example, in mass spectrometry, lyophilizers, and vacuum ovens. The cabinet 20 substantially surrounds the vacuum pump. The cabinet 20 includes a first side wall 24, a top surface 26, and a second side wall 28. The top surface 26 is joined to the first side wall 24 along an edge 25, and is joined to the second side wall 28 along an edge 27. In certain embodiments the top surface 26, and side walls 24, 28 are integrally formed from a single material, such as a piece of bent sheet metal. However, in other implementations the top surface 26 and side walls 24, 28 are separately formed and then joined along edges 25, 27.

The top surface 26 and side walls 24, 28 define an interior space or enclosure into which a vacuum pump is placed. In addition, the cabinet 20 also includes a front 36 and back 40, placed at opposite ends of the cabinet 20. The front 36 can include a door 38 providing an opening to the front of a vacuum pump placed within the cabinet. The cabinet 20 is constructed such that additional access is easily gained into the cabinet 20 by removing one or more access panels that form at least a part of the first wall 24, top surface 26, or second wall 28. First access panel 32 forms a portion of the first wall 24 and a portion of the top surface 26. Second access panel 34 forms a portion of the second wall 28 and top surface 26.

The cabinet 20 shown in the depicted embodiment is constructed such that first access panel 32 and second access panel 34 are each easily removable from the cabinet 20 such as by loosening screws 52 and lifting the access panel 32 or 34 from the cabinet 20. Removal of the first and second access panels 32, 34 provides access to the interior of the cabinet 20, in particular to a vacuum pump within the cabinet 20.

Figure 2:
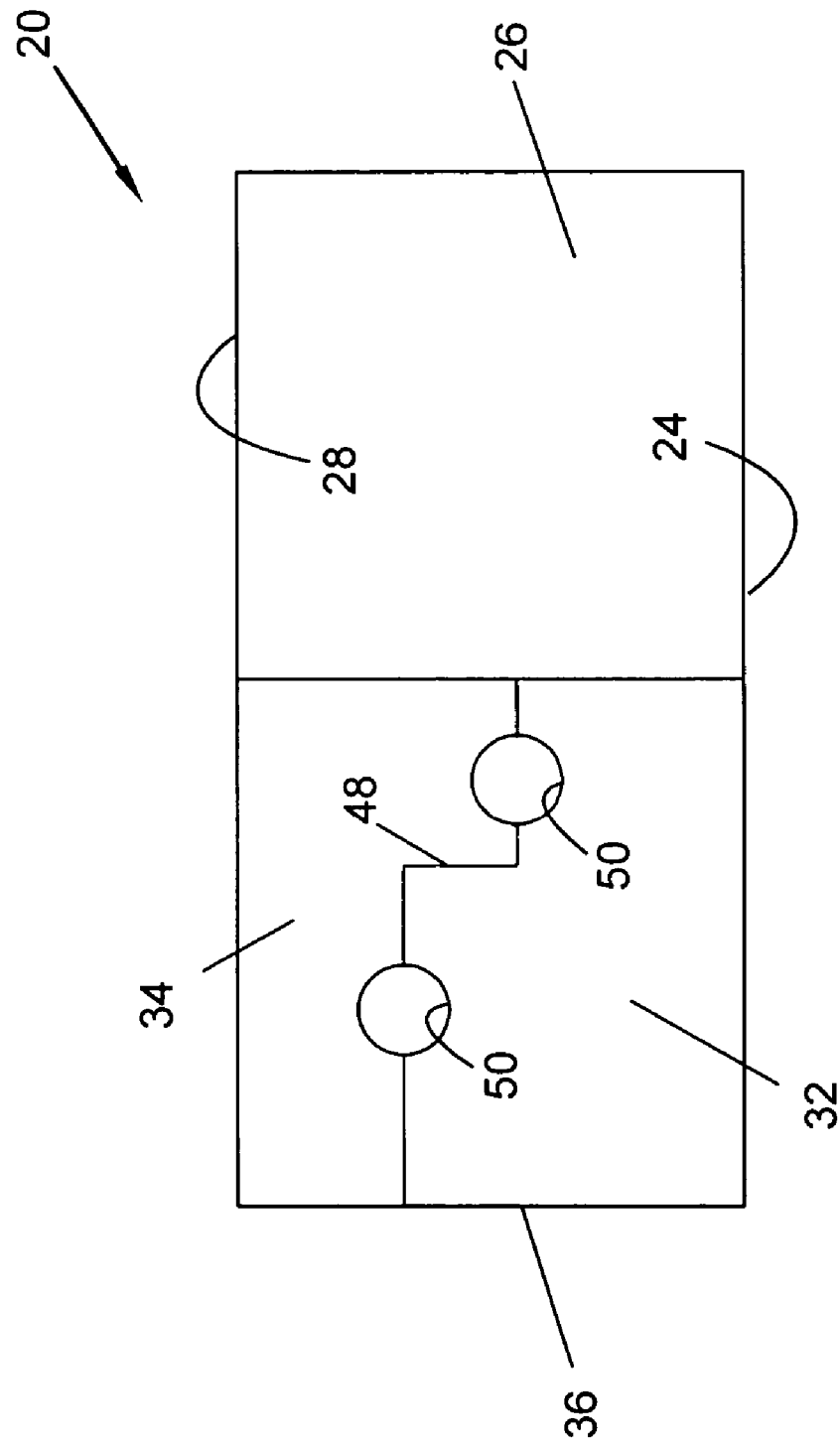
FIG. 2 is a simplified top view of a cabinet for retaining a vacuum pump.

FIG. 2 shows a simplified top view of the cabinet 20 shown in FIG. 1, indicating the relative top positions of the first access panel 32 and second access panel 34 in the depicted embodiment. FIG. 2 also shows two ports 50 that are formed along the edges of first and second access panels 32, 34. These ports 50 allow hoses and vacuum lines to extend into the cabinet 20, and also allow portions of a vacuum pump to extend out of the cabinet 20, as necessary. In some embodiments the cabinet 20 contains just one port, while in other embodiments the cabinet 20 contains more than two ports.

The first and second access panels 32, 34 are constructed, in certain embodiments, to form a sufficient portion of the top surface 26 of the cabinet 20 to allow removal of a vacuum pump from within the cabinet 20. However, in other implementations removal of the first and second access panels 32, 34 is sufficient to give access to the interior of the cabinet 20 without allowing removal of the full vacuum pump within the cabinet 20.

The depicted embodiment includes two removable access panels 32, 34, but alternative embodiments have just one removable access panel or more than two removable access panels 32, 34. Also, although the depicted embodiment shows access panels 32, 34 covering a portion of the top surface 26 and each of the first wall 24 and second wall 28, alternative embodiments include access panels that cover portions of the front or back of the cabinet 20.

First access panel 32 and second access panel 34 meet along an edge 48, as shown in FIGS. 1 and 2. In some implementations the first and second access panels 32, 34 overlap along edge 48, while in other implementations access panels 32, 34 abut against one another without overlapping. The access panels 32, 24 combine to form ports 50 that allow for tubes, pipes, and cords of a vacuum pump to extend out from the cabinet 20. Various parts of the vacuum pump can also extend through these ports 50, such as an exhaust tube or an exhaust filter. The edge of each port 50 in the shown embodiment is formed by part of each of the access panels 32, 34. Thus, the access panels 32, 34 can be lifted from the cabinet 20 without removing any hoses, tubes, or other articles extending through the ports 50.

In some embodiments of the invention, alternative access panels 32, 34 are provided with differing arrangements for ports 50, allowing customization of the enclosure for different vacuum pumps or different vacuum pump configurations. For example, more or fewer ports 50 can be provided, as well as different positions of the ports 50 and different sizes of the ports 50. It is possible to customize a cabinet for a specific configuration of ports 50 by selecting customized access panels without changing the remainder of the cabinet.

The surface area covered by the removable access panels 32, 34 can vary depending upon the embodiment. In some embodiments, removable access panels cover a portion of the top surface 26 and a portion of one or more sides 24, 28. In yet other embodiments, the removable access panels 32, 34 cover a portion of the top surface 32, 34 and a portion of the back 40 of the enclosure. In addition, although the cabinet 20 shown in FIGS. 1 to 7 has substantially planar surfaces joined along straight edges, alternative embodiments include those in which the cabinet 20 has curved surfaces and/or non-linear edges.

Figure 3:
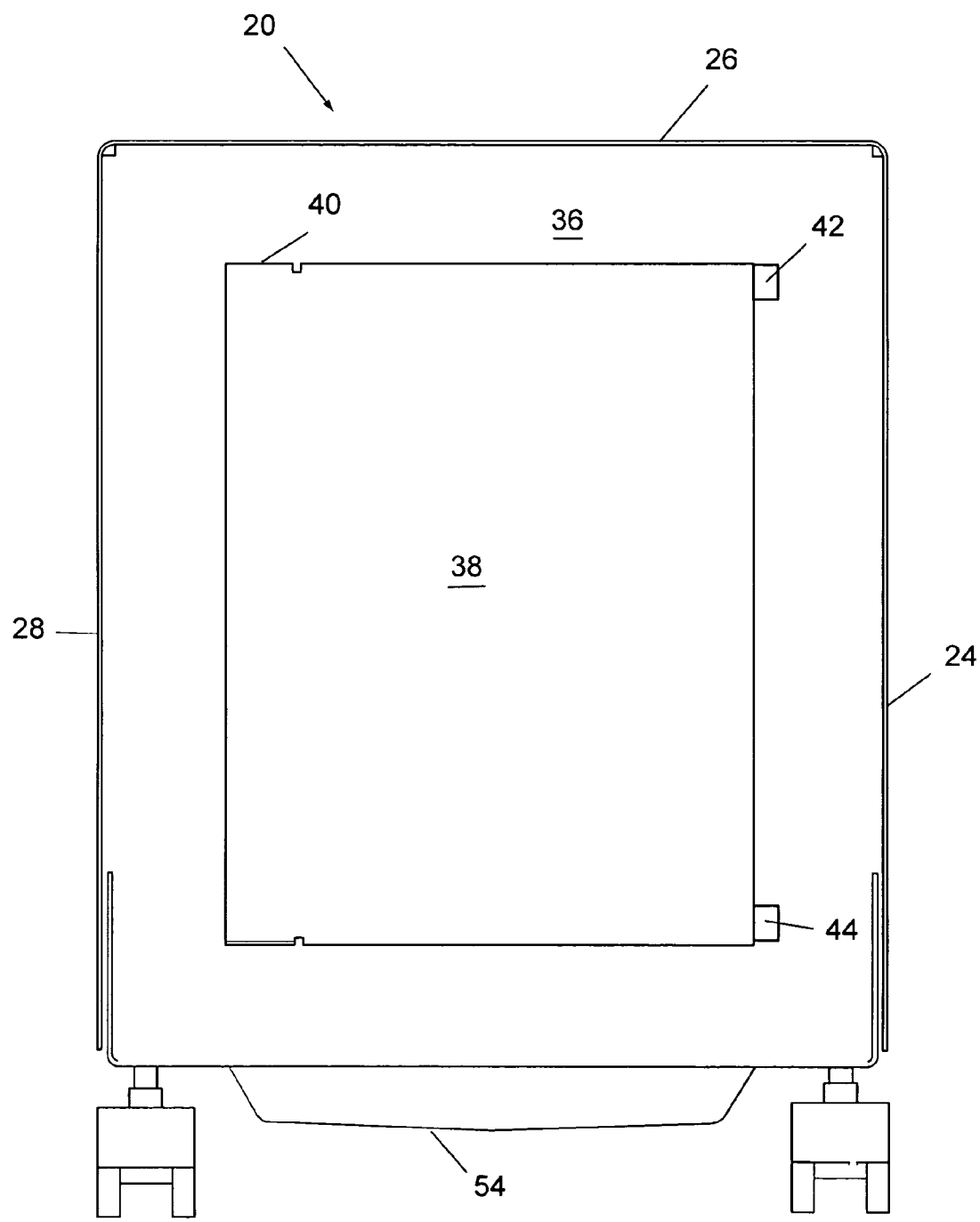
FIG. 3 is a front view of a cabinet for retaining a vacuum pump.

In further reference now to FIGS. 1 and 3, the cabinet 20 includes a front 36 having a door 38. In the depicted embodiment, the door 38 rotates around a hinge 41, and can be kept in a closed position by hand fastening screws 42, 44. It will be appreciated, however, that numerous alternative mechanisms can be used for allowing the opening or removal of door 38, including hinges, latches, fasteners, etcetera. In addition, various mechanisms, latches, locks, and fasteners may be used instead of screws 42, 44 to keep the door 38 closed.

In some implementations the cabinet 20 is equipped with a removable catch basin 54 for retaining lubricant discharged from the vacuum pump. This catch basin 54, also referred to as an oil pan or lubricant pan, retains lubricant discharged from the vacuum pump, and this retained lubricant can then periodically be removed from the cabinet 20. The cabinet 20 depicted in the embodiment shown in FIG. 1 is mounted on a plurality of wheels 56. The wheels permit the cabinet 20 to be easily moved to different locations, and to be readily stored in a convenient location, such as under a laboratory bench. In some implementations the wheels 56 can be locked, thereby preventing unintentional rolling of the enclosure. In other implementations no wheels are used.

Figure 4:
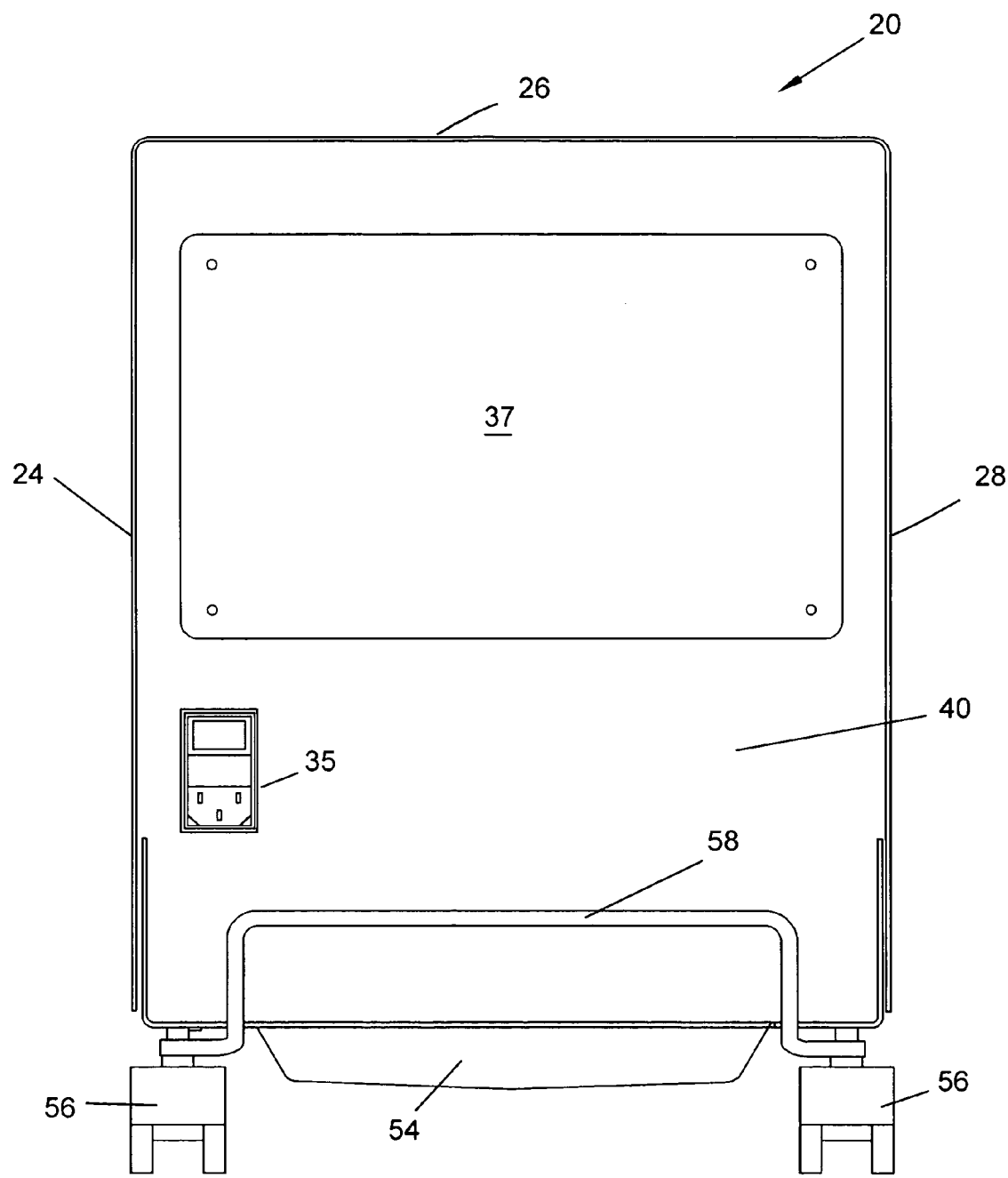
FIG. 4 is a rear view of a cabinet for retaining a vacuum pump.

Referring now to FIG. 4, the back 40 of a cabinet 20 is shown. The back 40 of the cabinet 20 can include, for example, a junction 35 for connecting the enclosure to a power source. The back 40 can also include a pivoting stand 58 that rotates to elevate the back 40 of the cabinet relative to the front 36, thereby allowing collected lubricant in the catch basin 54 to flow out a drain spout in the front of the basin.

In certain implementations, the back 40 is constructed to permit the flow of cooling air streams in or out of the cabinet 20 while also limiting the escape of sound from the cabinet 20. In one embodiment, the back 40 includes one or more openings into which one or more cooling fans are positioned. A single fan can be used to either exhaust air from the cabinet 20 or to draw air into the cabinet 20. Alternatively, two fans are used, one to draw in air and one to exhaust it. In yet other implementations, two or more fans are used to both draw in air or to exhaust air. In a simple configuration just one fan is used, and it is positioned at the back 40 of the cabinet 20 to exhaust air from the cabinet 20. As air is exhausted, additional air can be drawn into the cabinet 20 from a gap around the front door 38 of the cabinet 20 or along other openings in the cabinet 20, such as from beneath the cabinet 20 or around the edges of the catch basin 54.

The volume of noise escaping from the back 40 of cabinet 20 is limited in certain embodiments by placing a baffle 37 over the opening or opening in the back 40 of the cabinet 20. In certain embodiments, the baffle 37 includes a substantially flat sheet of material (such as plastic or metal) that occludes the opening or openings beneath it, but which has a gap along its perimeter to allow the ready flow of air around the sheet. In some implementations, the gap is located around the entire perimeter of the sheet, while in other implementations the gap is along only a portion of the perimeter. In other implementations, the baffle may be curved and/or have a nonrectangular shape, taking on the shape of the fan(s).

Figure 5:
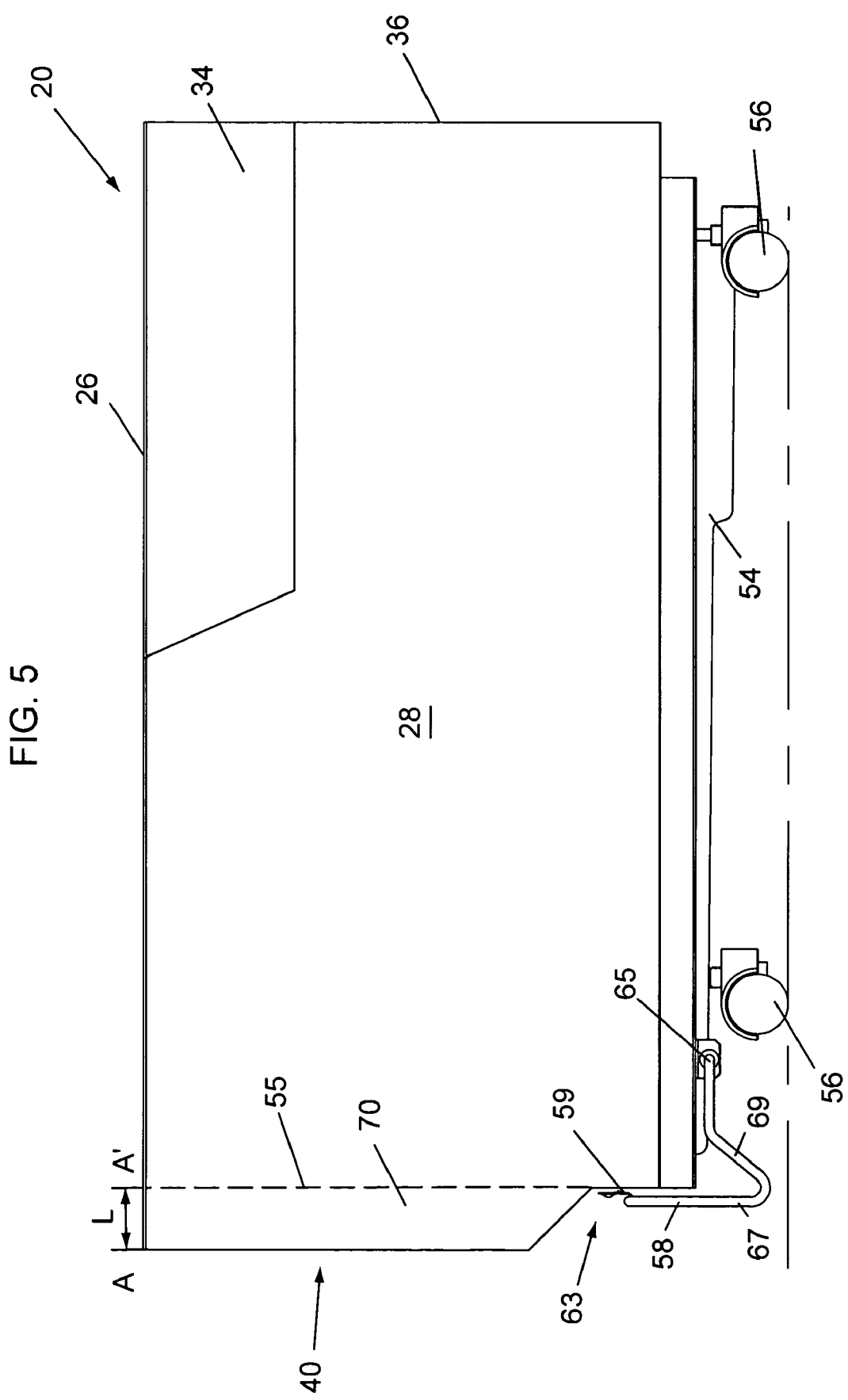
FIG. 5 is a side view of a cabinet for retaining a vacuum pump.

Referring now to FIG. 5, the various portions of the cabinet 20 are shown in side elevational view, including the front 36, back 40, top surface 26, and second side 28, which includes a portion of second access panel 34. The catch basin 54 beneath the cabinet 20 is depicted as running along most of the bottom of the cabinet 20, although in other embodiments the catch basin 54 is smaller. Pivoting stand 58, shown in end view in FIG. 4 is shown in side view in FIG. 5, and also shows the pivot point 65 around which the pivoting stand 58 rotates. In FIG. 5 the pivoting stand 58 is stowed away at the back 40 of the cabinet 20, retained by latch 59. In this depiction all wheels 56 of the cabinet 20 are on the ground, and the lubricant collection basin 54 is in a substantially horizontal orientation promoting collection of lubricant. In this embodiment, the collection basin slopes from back to front and as a deeper well at the front for pooling the lubricant.

Figure 6:
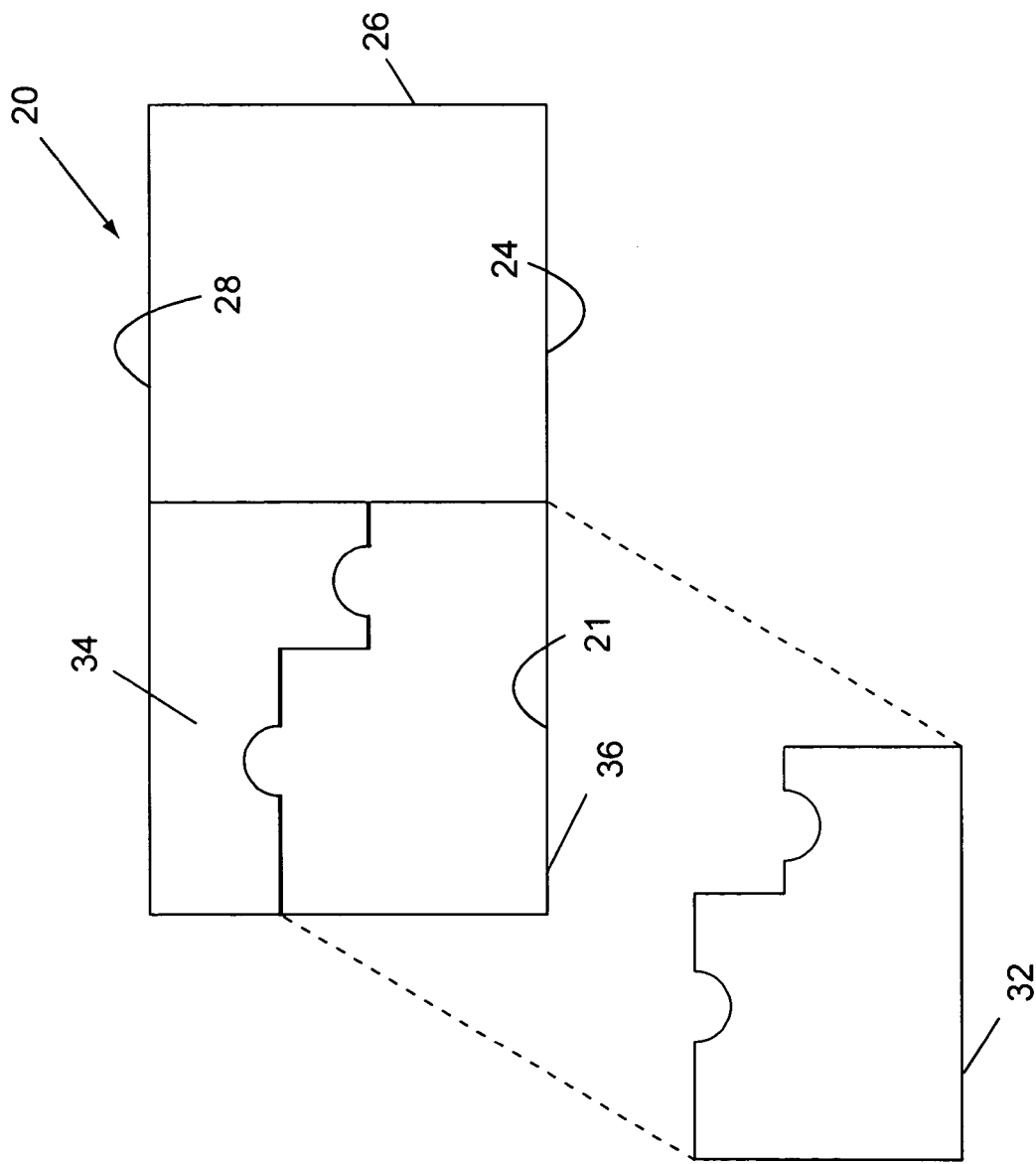
FIG. 6 is a simplified top view of a cabinet for retaining a vacuum pump, showing a first side portion removed.
Figure 7:
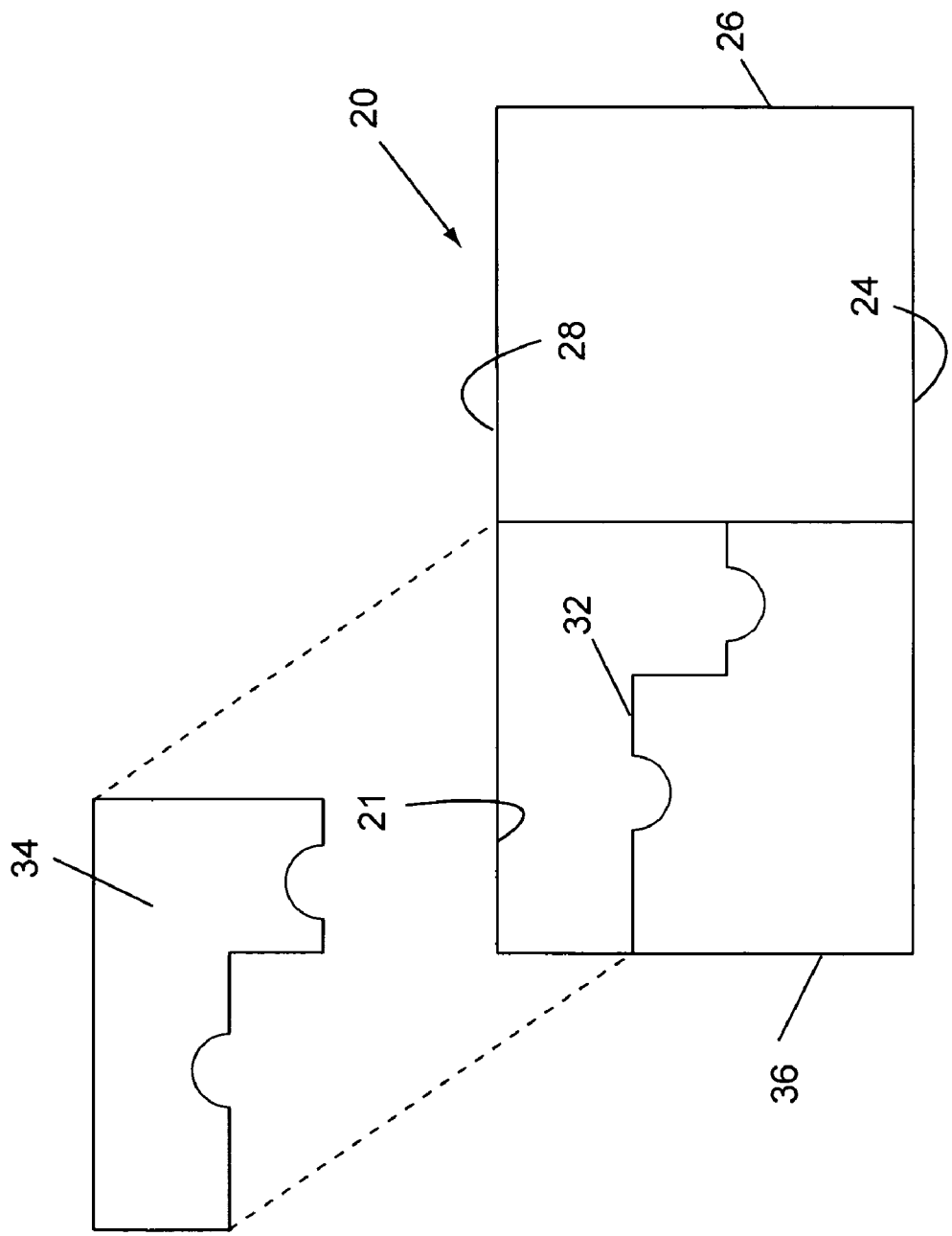
FIG. 7 is a simplified top view of a cabinet for retaining a vacuum pump, showing a second side portion removed.

Each of the first and second access panels 32, 34 can be independently removed in certain embodiments of the invention, or each can be removed together. FIG. 6 shows a top view of the cabinet 20 after the first access panel 32 has been removed, thereby revealing the interior 21 of the cabinet 20. FIG. 7 shows a top view of the cabinet 20 after the second access panel 34 has been removed, thereby also revealing the interior 21 of the cabinet 20. FIGS. 6 and 7 show alternate removal of the two access panels 32, 34, but it is also possible to remove both access panels 32, 34 at once.

Figure 8:
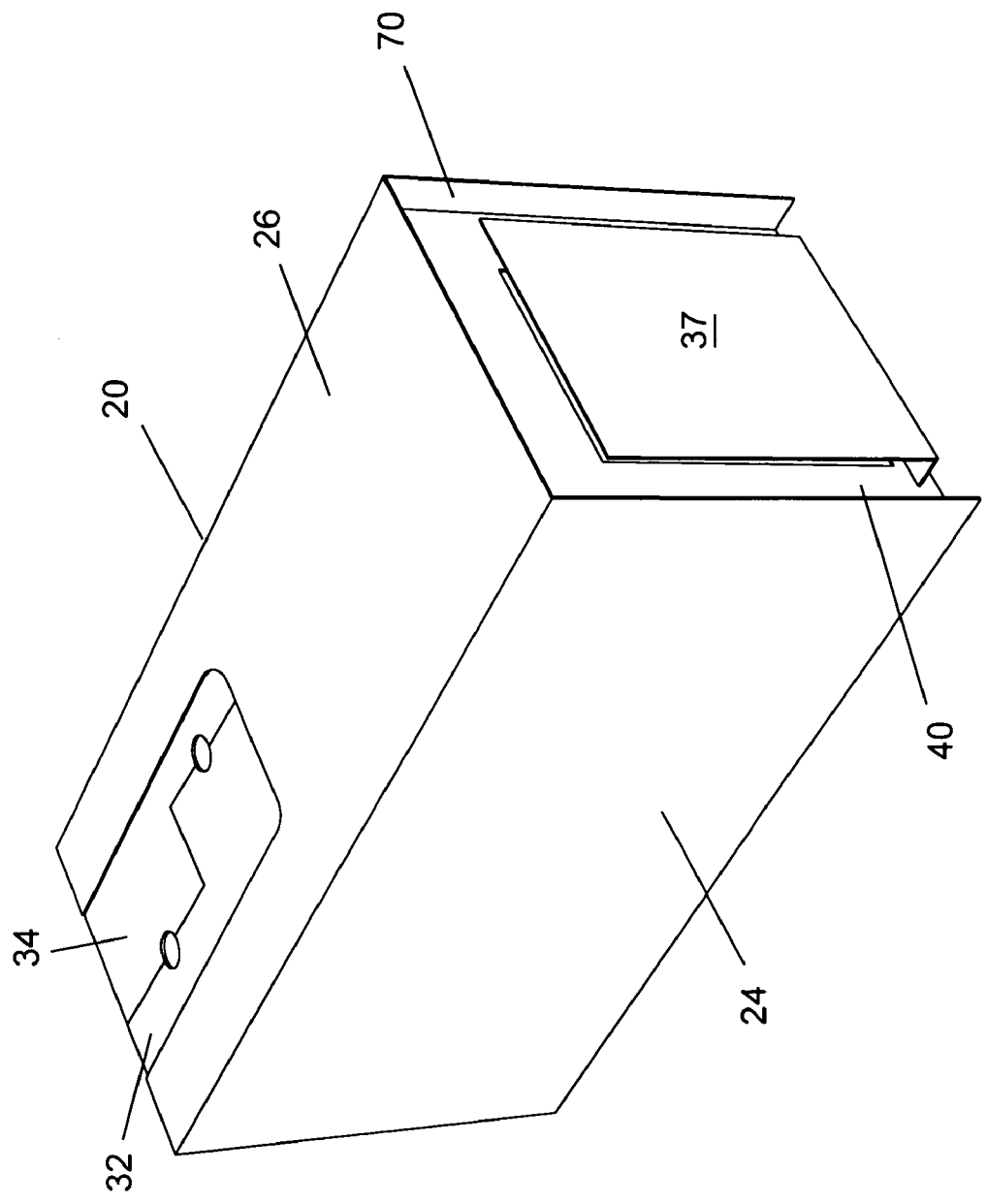
FIG. 8 is a rear perspective view of a cabinet for retaining a vacuum pump.
Figure 9:
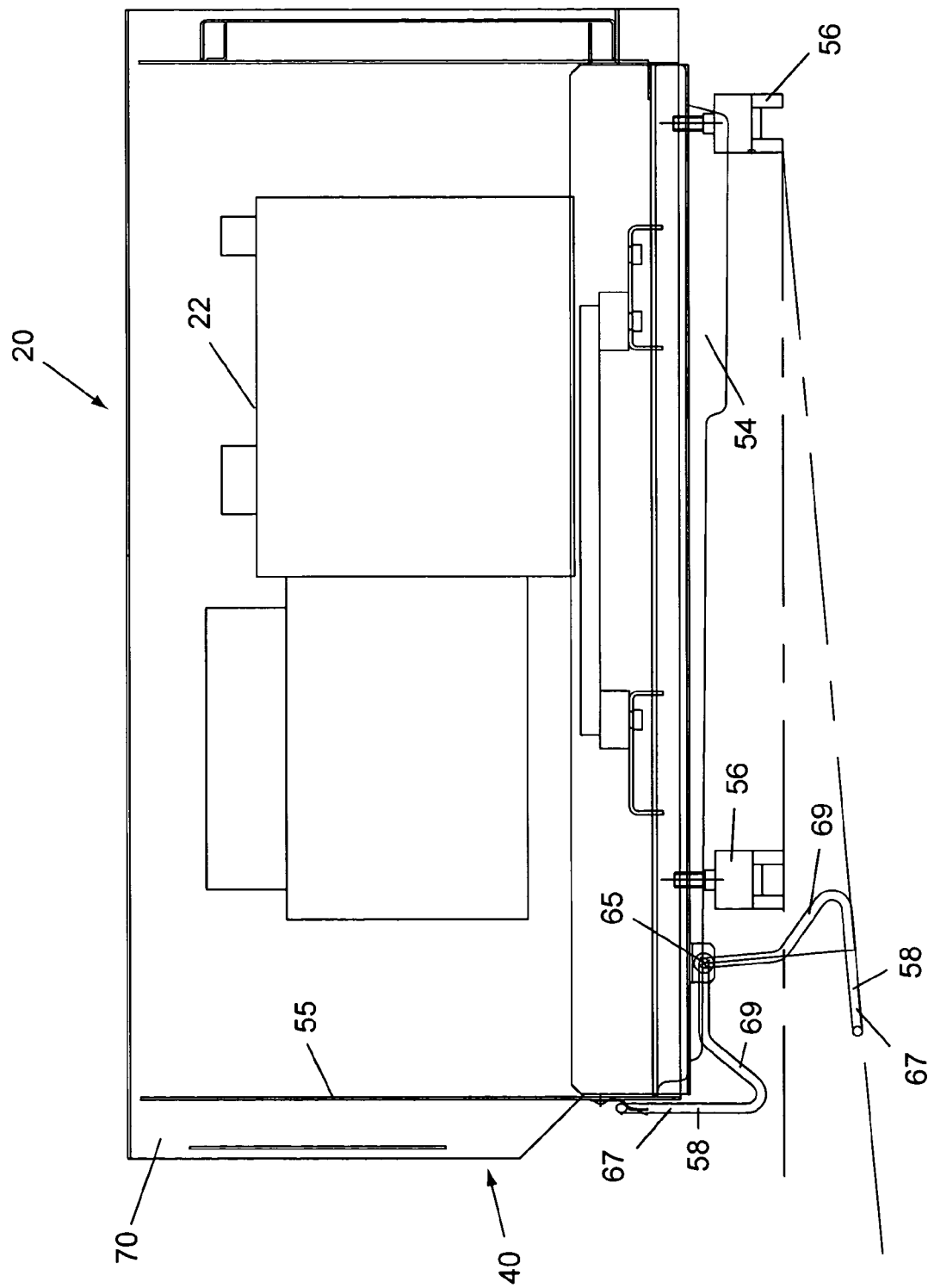
FIG. 9 is a side cross sectional view of a cabinet for retaining a vacuum pump.

FIG. 8 shows an additional view of the back 40 of a cabinet 20, along with a baffle 37. A lip 70 is shown extending along both sides of the cabinet 20 as well as along the top surface 26. The cabinet 20 shown in FIG. 8 also depicts two removable access panels 32, 34, although in this embodiment the access panels 32, 34 cover only a portion of the top surface 26, rather than along either side of the cabinet 20. FIG. 9 shows a cross section of the cabinet 20 shown in FIG. 5, and depicts the two positions for the pivoting stand 58, indicating the manner in which the back of the enclosure is elevated to permit drainage into the collection basin 54.

In order to drain lubricant into the collection basin 54, the pivoting stand 58 can be rotated so that its foot portion 67 contacts the floor beneath the enclosure 54, causing the rear portion of the catch basin 54 to become elevated as the basin and/or cabinet 20 is partially supported by the leg 69 of the pivoting stand 58. After the collection basin is drained the pivoting stand 58 can be rotated back to a stored position and the collection basin 54 returned to a more horizontal position. In some implementations the collection basin 54 can slide out on rails to be emptied The volume of noise escaping from the cabinet 20 is also controlled, in some embodiments, by extending some or all of sides 24, 28 and the top surface 26 of the cabinet 20 past the back 40 of the cabinet 20. FIG. 5 shows a phantom line where the plane 55 of the back 40 is located. As shown in FIG. 5, the side wall 28 can be made to have an extended portion 70 that reaches past the plane 55 of the back 40, effectively creating lip 70. The lip 70 extends past the plane 55 of the back 40 by a distance L measured between lines A-A'. In some implementations at least a portion of the top surface, first side, or second side of the cabinet 20 extends beyond the plane 55 of the back 40 of the cabinet 20 by a distance L of at least 0.5 inches, while in other implementations a portion of the top surface, first side, or second side of the enclosure extends beyond the plane defined by the back surface of the cabinet 20 by a distance L of at least 1.0 inches, while in yet other implementations a portion of the top surface, first side, or second side of the enclosure extends beyond the plane defined by the back surface of the cabinet 22 by a distance L at least 1.5 inches.

Lip 70 extend around the sides and top of the cabinet in some embodiments, yet does not extend along the bottom of the cabinet, so that in operation the cabinet can be positioned against a wall or other flat surface so that the lip 70 comes in close proximity to the wall or contact the wall. This creates a channel for air flow between the back 40 of the cabinet 20 and then downward toward the floor, since only the bottom or lower portions of the cabinet 20 do not have a lip 70. In the embodiment depicted in FIG. 5, the lip 70 does not extend along the lower portions of side wall 28, reducing resistance to air flow at these lower portions while also allowing the cabinet 20 to be pressed against a wall which has a baseboard or trim along the floor.

In certain embodiments the cabinet 20 further comprises a sound insulating material on the interior of the enclosure. The sound insulating material comprises foam in some implementations. Alternatively, a sound absorbing woven or non-woven material can be used, or other sound absorbing material. The sound insulating material, such as foam, can be used to line part or the entire interior of the cabinet.

Figure 16:
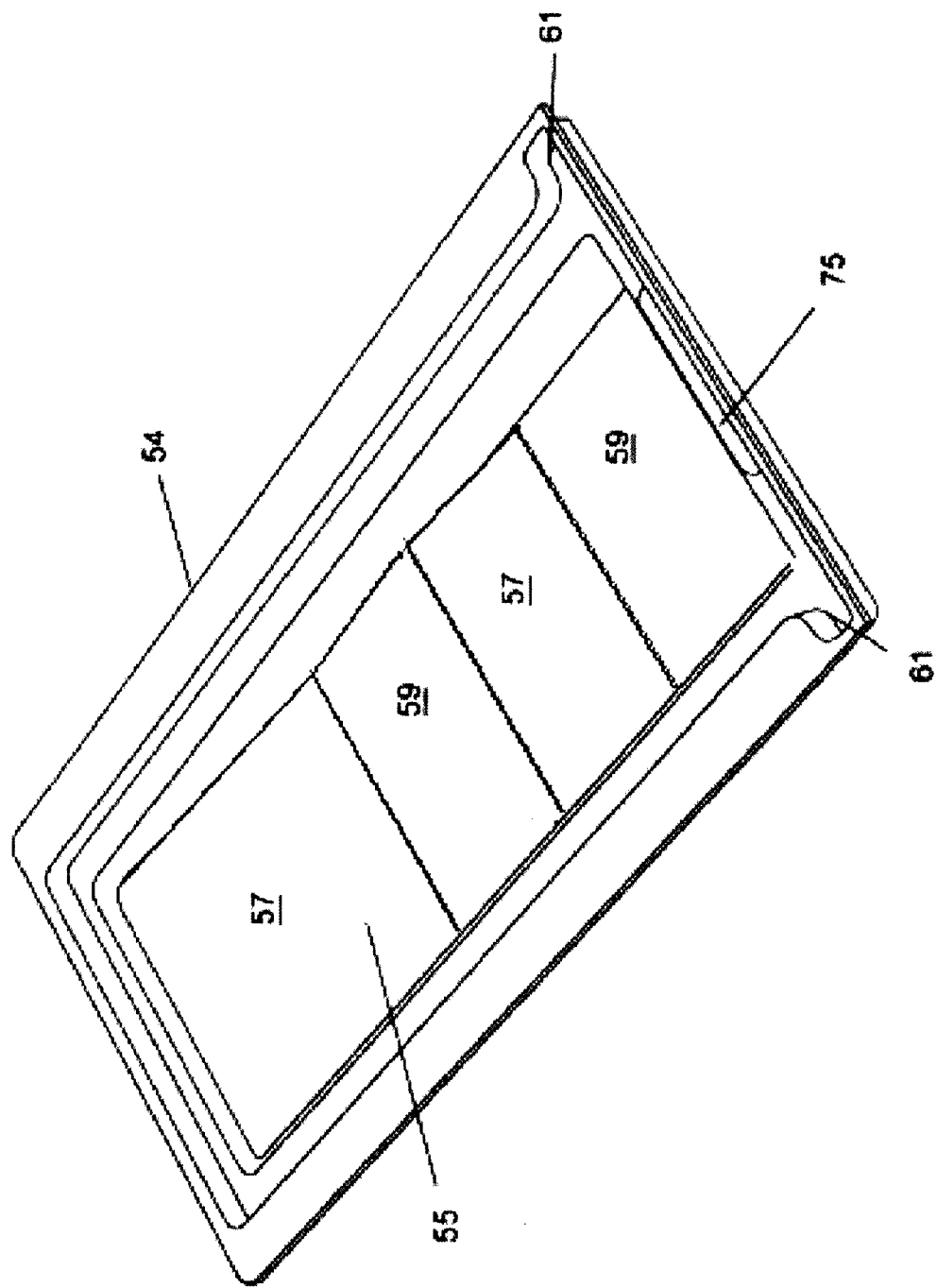
FIG. 16 is a top perspective view of an alternative embodiment of a catch basin for retaining lubricant from a vacuum pump.

The invention is also directed to an apparatus for collecting lubricant from a vacuum pump, the apparatus comprising a variable depth basin configured to receive and retain lubricant from the vacuum pump. The variable depth basin includes a front portion having a first depth and a rear portion having a second depth. In some implementations the variable depth basin has a bottom inclined from horizontal such that the basin is deeper near its front. For example, the variable depth basin can have a first, shallow portion inclined to a second, deeper portion. The variable depth basin, as exemplified in FIG. 16. includes a plurality of substantially horizontal areas 59 connected by inclined areas 57 in other embodiments. The variable depth basin has one pour spout configured to drain collected lubricant from the basin in some embodiments, and the variable depth basin has two pour spouts in certain embodiments.

Figure 10:
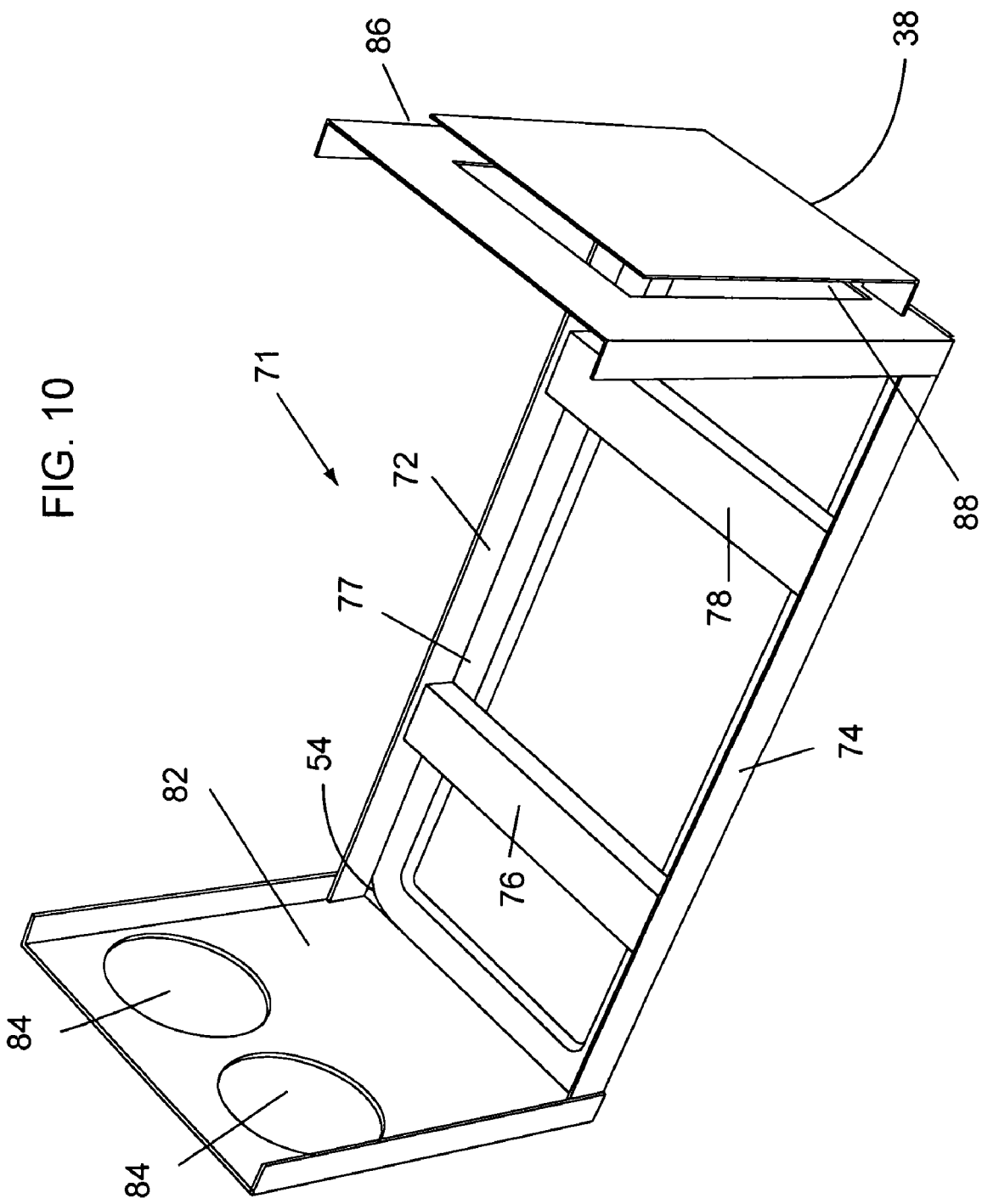
FIG. 10 is a perspective view of a frame of a cabinet for retaining a vacuum pump, showing a catch basin beneath the frame for retaining lubricant.
Figure 11:
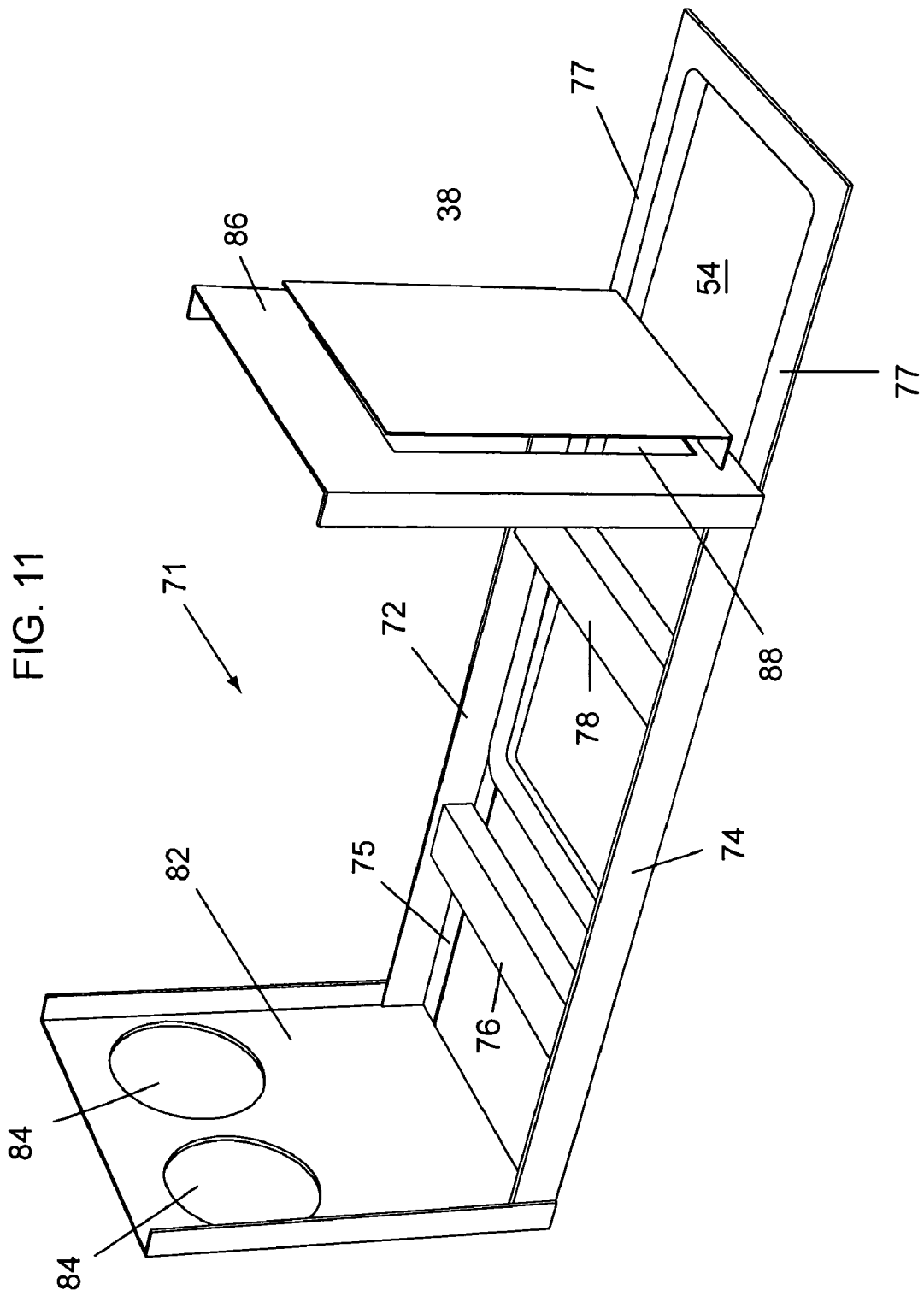
FIG. 11 is a perspective view of a frame of a cabinet for retaining a vacuum pump, showing a catch basin beneath the frame for retaining lubricant, the catch basin partially withdrawn from the frame.

Two opposite edges of the variable depth basin 54 are configured to slidably engage the sides of a cabinet for holding a vacuum pump. In some embodiments opposite edges of the variable depth basin 54 are configured to slidably engage rails 75 along the sides of the frame 71, and these opposite edges of the variable depth basin 54 comprise a lip 77 extending along the edges of the basin 54. Referring now to FIGS. 10 and 11, the interior of an example cabinet is disclosed. FIGS. 10 and 11 show a frame 71 onto which a vacuum pump can be placed. In the depicted embodiment, frame 71 includes first side member 72 and second side member 74, along with a first cross member 76 and a second cross member 78. The rails 75 comprise a portion of the side members 72, 74 in some implementations, and are independent of the side members 72, 74 in other implementations.

The back 82 of the frame 71 is shown having two ventilation openings 84, which are typically covered by a baffle on the exterior of the enclosure (not shown). The front 86 of the frame 71 is shown, along with a door or cover 38. In this embodiment the door 38 does not completely seal the front of the enclosure, and instead has a gap 88 around at least a portion of its perimeter. This gap 88 allows air to pass through the front of the enclosure, to then flow around a vacuum pump within the enclosure before exiting out one or both of the ventilation openings 84 at the back of the enclosure. However, in alternative embodiments the door 38 completely seals the front of the cabinet 20, thereby providing improved sound insulation. In these embodiments, air flows in from other locations to provide cooling. Also, in some alternative embodiments the flow of air is into the cabinet from the back ventilation openings and then through the cabinet and out the front.

Beneath the frame 71 is positioned a lubricant collection basin 54. The basin 54 covers substantially the entire underside of the cabinet 20 in the embodiment shown, although in other implementations the basin is configured to cover less than the entire underside of the enclosure. The basin shown in FIGS. 10 and 11 is removable from the cabinet 20. Removal of the basin 54 allows it to be more easily cleaned and can help in draining the basin 54, although alternative embodiments provide for a stationary basin 54 that is not readily removed from the cabinet 20.

When the basin 54 is removable, such as in the embodiment shown in FIGS. 10 and 11, the basin 54 is typically constructed such that it can be removed without spilling lubricant collected in the basin, and thus it is generally constructed so that it can be removed without substantial tilting. The embodiment shown in FIGS. 10 and 11 slides along the first and second side rails 72, 74 of the frame 71 of the cabinet 20, thereby allowing the basin 54 to be removed while being kept horizontal to reduce or eliminate spilling.

Figure 12:
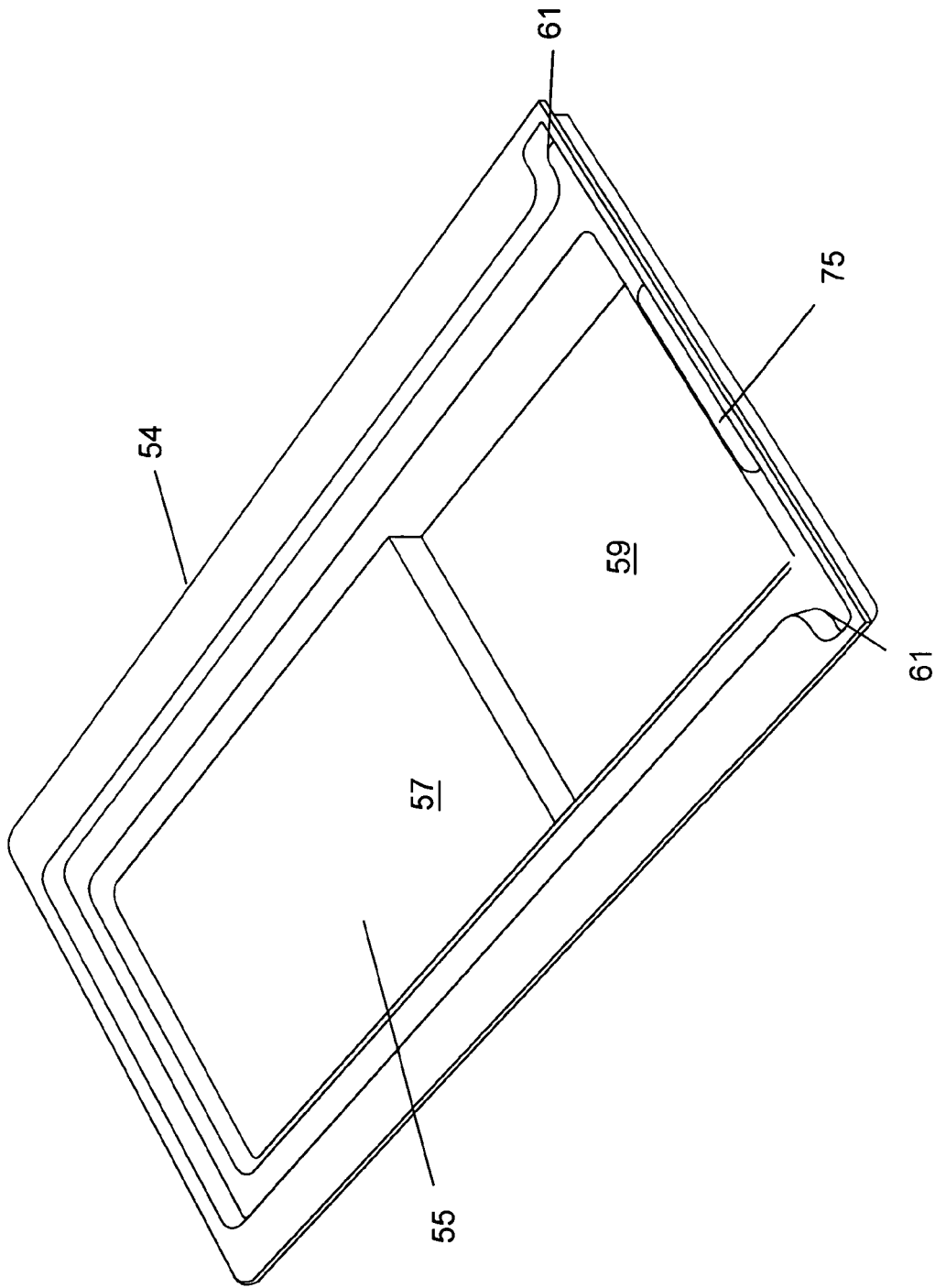
FIG. 12 is a top perspective view of a catch basin for retaining lubricant from a vacuum pump.
Figure 13:
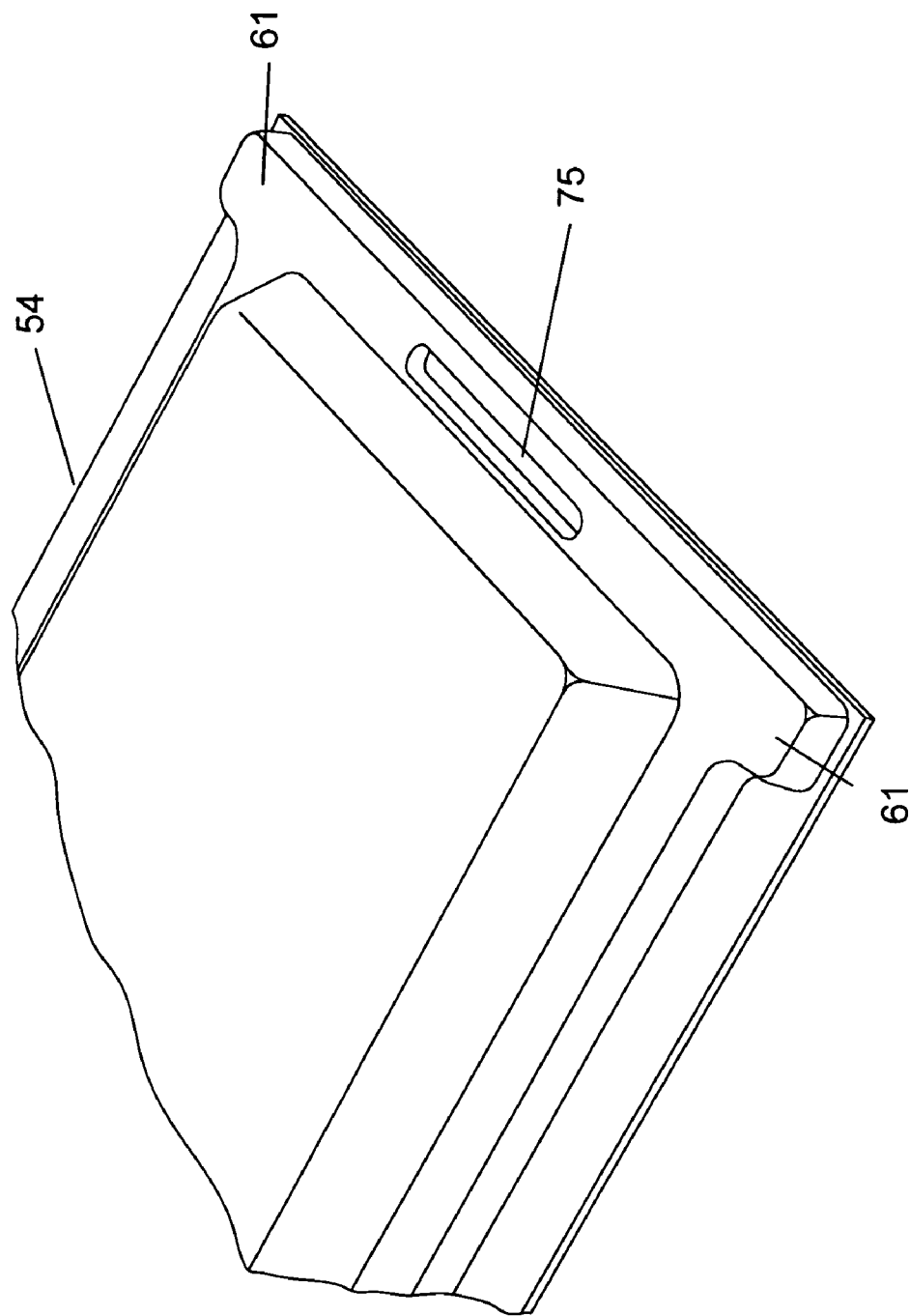
FIG. 13 is a partial bottom perspective view of a catch basin for retaining lubricant from a vacuum pump.

Additional aspects of the basin 54 are shown in additional detail in FIGS. 12 and 13. FIG. 12 shows a top perspective view of an example embodiment for a basin 54, while FIG. 13 shows a partial bottom perspective view of the front of a basin 54. In the depicted basin 54, the bottom 55 of the basin has a shallow inclined portion 57 draining into a deeper reservoir portion 59. The shallow inclined portion 57 is typically positioned near the back of the basin 54, and lubricant dripping onto the shallow inclined portion 57 drains into the deeper reservoir portion 59. The reservoir portion 59 can have a horizontal bottom, an inclined bottom, or other shape. Although the shallow inclined portion 57 is shown as being a substantially planar surface, alternative configurations are possible, although in general it is desirable to have good drainage from the inclined portion down to the reservoir portion. The basin is removable from the cabinet 20 by pulling on handle 75 in certain embodiments.

Periodically it is necessary to remove lubricant that has accumulated inside the basin 54 as when there is some leakage (spillover) from a pump, or when the pump lubricant has been drained into the collection basin. In one implementation the basin is drained by either of two drainage spouts 61 positioned on corners of the basin 54. The drainage spouts 61 are located so that they extend beyond any wheels supporting the cabinet 20, thereby preventing spilling of lubricant onto the wheels during drainage into the basin 54. In other implementations a single drainage spout is used, such as from one of the corners of the basin or at the front center of the basin. In yet other implementations no drainage spout is provided, in which case lubricant is removed from the basin by a drain plug, pump, scoop, etcetera. The stepped design is similar to the embodiment shown in FIGS. 12 and 13, but includes multiple areas of differing inclines. Some areas have relatively shallow inclines, while other areas have relatively steep inclines. In yet other implementations the transitions from steep inclines to shallow inclines are less abrupt, resulting in a curved or undulating bottom that gets generally deeper toward the front of the basin than toward the back.

During operation of a vacuum pump within the enclosure, the pump is placed on top of the cross members 76, 78 in the embodiment shown in FIGS. 10 and 11. Optionally the pump is bolted or otherwise secured to the cross members 76, 78 or other portion of the frame 71. The area between the cross members 76, 78 is open in some implementations, and is covered with additional support members in other implementations. Generally, however, there are sufficient openings on the underside of the frame 71 to allow lubricant readily to flow from the vacuum pump down into the basin 54, thereby collecting all spillage (leakage) in the collection basin. Typically the vacuum pump is elevated above the basin 54 and does not rest on top of the basin, thereby allowing the basin to be removed from the enclosure without lifting or moving the vacuum pump. This design also avoids the standing of the pump in lubricant. It will be appreciated that although the depicted embodiment in the figures shows a pump supported on a frame with cross members, numerous other support designs are possible.

As noted above, in some embodiments the basin 54 on the underside of the cabinet 20 can be drained by removal of the basin 54 from the cabinet 20 and then pouring the contents from the basin 54. In addition, in some embodiments the enclosure is constructed such that the basin 54 is readily tilted from a horizontal position to an inclined position to allow fluid to flow through the spouts and drain the basin. In some embodiments the entire cabinet 20 is tilted to permit draining from the basin 54, while in other embodiments only the basin itself is tilted, or the basin along with supporting elements are tilted.

Figure 14:
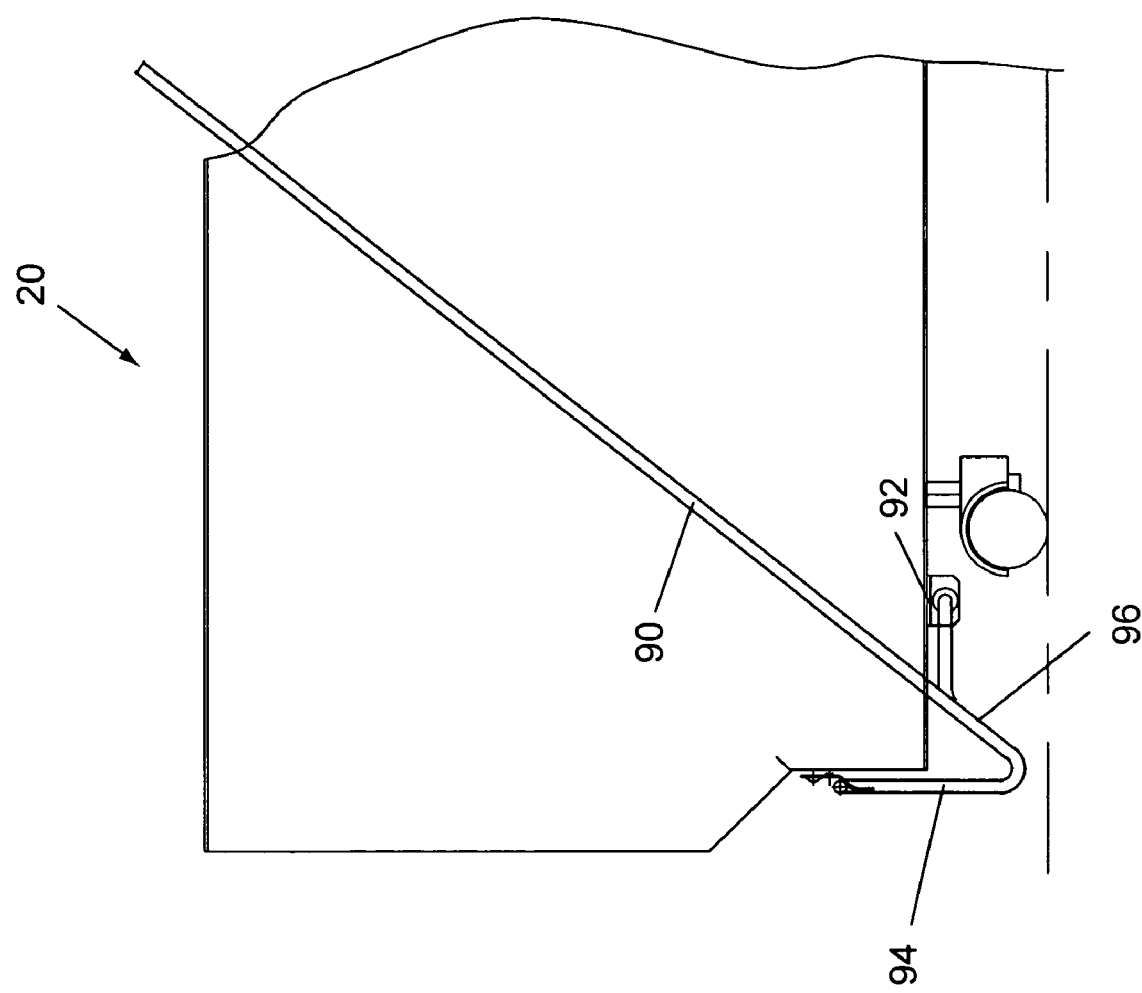
FIG. 14 is a partial side elevational view of a cabinet for retaining a vacuum pump, the enclosure including an apparatus for elevating a portion of the enclosure.
Figure 15:
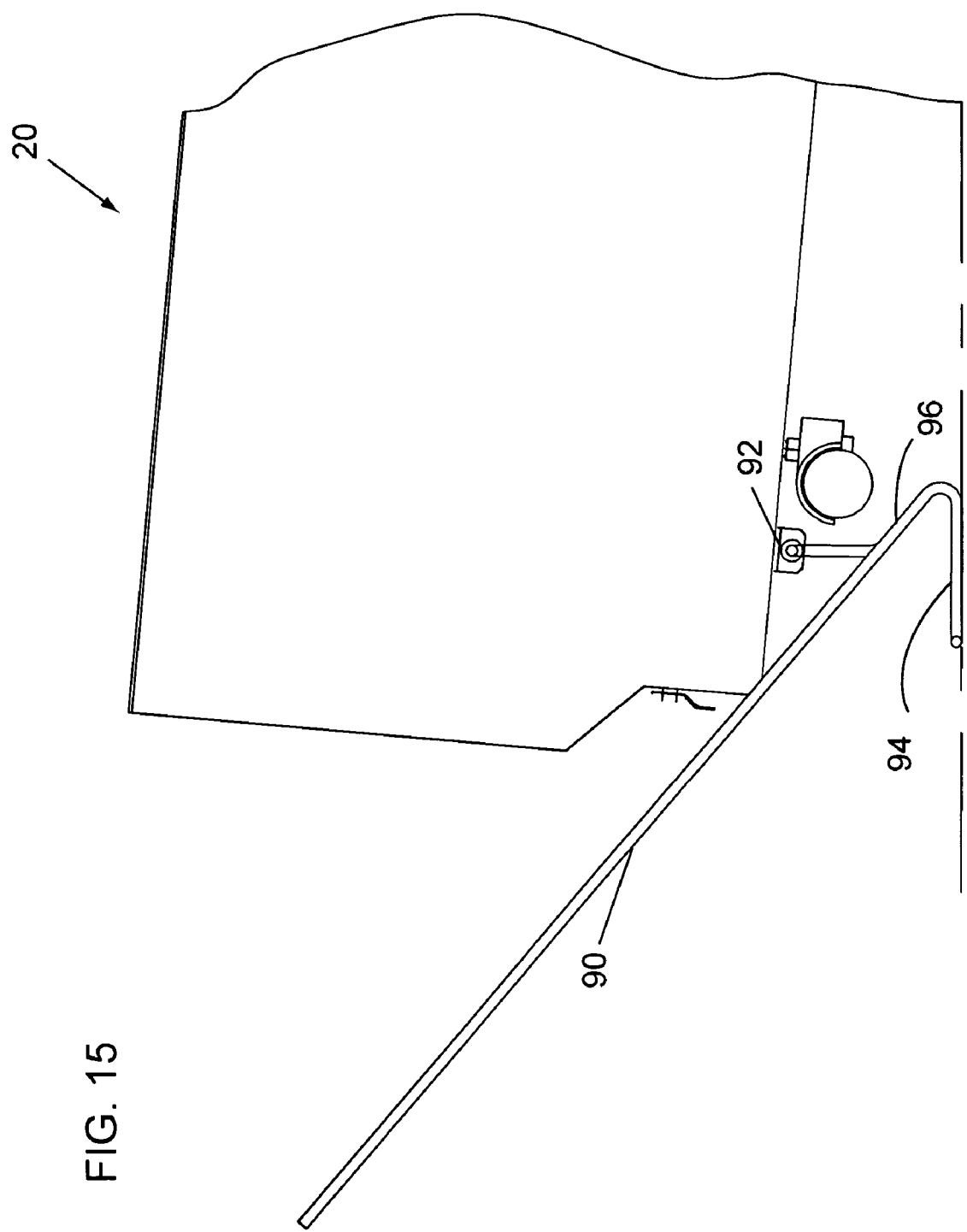
FIG. 15 is a partial side elevational view of a cabinet for retaining a vacuum pump, the enclosure including an apparatus for elevating a portion of the enclosure.

A further embodiment of an apparatus for aiding in draining of a catch basin is shown in FIGS. 14 and 15. In one implementation the basin 54 is tilted by elevating the back end of the cabinet 20 or the back end of the basin 54 to pour lubricant from the spout or spouts at the front of the basin 54. The back end of the cabinet 20 can be lifted by using a pivoting stand 90, depicted in FIGS. 14 and 15. The pivoting stand 90 rotates round an axis 92. In a first position, shown in FIG. 14, the pivoting stand 90 is tucked back into a stored position where it is not applying a lifting force to the enclosure 20. In a second position, shown in FIG. 15, the pivoting stand 90 is rotated around so that a foot 94 touches the floor and lifts the back of the cabinet 20 by supporting the cabinet on leg 96 of the pivoting stand 90. The pivoting stand 90 is secured to opposite edges of the catch basin itself in certain embodiments, and is secured to opposite edges of the cabinet 20 in other implementations.

The various embodiments described above are provided by way of illustration only and should not be construed to limit the invention. Those skilled in the art will readily recognize various modifications and changes that can be made to the present invention without following the example embodiments and applications illustrated and described herein, and without departing from the true spirit and scope of the present invention, which is set forth in the following claims.

The claimed invention is:

1. An apparatus for collecting lubricant from a vacuum pump, the apparatus comprising:
    a cabinet for retaining a vacuum pump, the cabinet comprising a top surface, a first side, and a second side at least partially defining an enclosure for the vacuum pump;
    a first support configured to retain a vacuum pump within the enclosure;
    a second support configured to hold an oil-retention basin beneath the vacuum pump such that the oil-retention basin is removable from the cabinet without removing the vacuum pump from the cabinet; and
    a variable depth basin configured to receive and retain lubricant from a vacuum pump, the variable depth basin comprising a front portion having a first depth, a rear portion having a second depth; and a plurality of substantially horizontal portions connected by inclined portions.

2. The apparatus for collecting lubricant from a vacuum pump of claim 1, wherein the variable depth basin has a bottom inclined from horizontal such that the basin is deeper near the front portion than the rear portion.

3. The apparatus for collecting lubricant from a vacuum pump of claim 1, wherein the variable depth basin has a first, shallow portion inclined to a second, deeper portion.

4. The apparatus for collecting lubricant from a vacuum pump of claim 1, wherein the variable depth basin has at least one pour spout configured to drain collected lubricant from the basin.

5. The apparatus for collecting lubricant from a vacuum pump of claim 1, wherein the variable depth basin has two pour spouts configured to drain collected lubricant from the basin.

6. The apparatus for collecting lubricant from a vacuum pump of claim 1, wherein the variable depth basin comprises a pour spout proximate the deepest portion of the basin.

7. The apparatus for collecting lubricant from a vacuum pump of claim 1, wherein two opposite edges of the variable depth basin are configured to slidably engage the sides of the enclosure for holding the vacuum pump.

8. The apparatus for collecting lubricant from a vacuum pump of claim 7, wherein the opposite edges of the variable depth basin configured to slidably engage the sides of the enclosure comprise a lip extending from the edges of the basin.

9. An apparatus for collecting lubricant from a vacuum pump, the apparatus comprising:
   an enclosure configured to retain a vacuum pump, the enclosure defined by a top surface, a first wall, and a second wall;
   a variable depth basin configured to receive and retain lubricant from a vacuum pump, the variable depth basin comprising a front portion having a first depth, a rear portion having a second depth, and a plurality of substantially horizontal portions connected by inclined portions;
   wherein the variable depth basin has a bottom inclined from horizontal such that the deepest portion of the basin is proximate the front of the basin;
   a first support within the enclosure, the first support configured to hold a vacuum pump in place during operation; and
   a second support within the enclosure, the second support configured to hold a variable depth basin beneath the vacuum pump, said second support configured to allow removal of the variable depth basin without removal of the vacuum pump from the enclosure.

10. The apparatus for collecting lubricant from a vacuum pump of claim 9, wherein two opposite edges of the variable depth basin are configured to slidably engage the sides of the enclosure.

11. The apparatus for collecting lubricant from a vacuum pump of claim 10, wherein the opposite edges of the variable depth basin configured to slidably engage the sides of the enclosure comprise a lip extending from edges of the basin.

12. An apparatus for collecting lubricant from a vacuum pump, the apparatus comprising:
   a variable depth basin configured to receive and retain lubricant from a vacuum pump, the variable depth basin comprising a front portion having a first depth, a rear portion having a second depth; and a plurality of substantially horizontal portions connected by inclined portions;
   first and second lips on the variable depth basin configured to support the variable depth basin; and
   a bottom of the variable depth basin inclined from horizontal such that the basin is deeper proximate the front portion;
   wherein the lips of the variable depth basin configured to slidably engage the sides of the enclosure comprise a lip extending from the edges of the basin.

* * * * *